United States Patent
Brooks et al.

(10) Patent No.: US 6,816,940 B2
(45) Date of Patent: Nov. 9, 2004

(54) CABLE MODEM HAVING A PROGRAMMABLE MEDIA ACCESS CONTROLLER

(75) Inventors: John M. Brooks, Niwot, CO (US); Brett A. Bernath, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 525 days.

(21) Appl. No.: 09/785,035

(22) Filed: Feb. 16, 2001

(65) Prior Publication Data

US 2001/0039600 A1 Nov. 8, 2001

Related U.S. Application Data

(60) Provisional application No. 60/183,130, filed on Feb. 17, 2000.

(51) Int. Cl.[7] .......................... G06F 13/36; G06F 13/20; H04N 7/173
(52) U.S. Cl. .......................... 710/308; 710/313; 725/111
(58) Field of Search ................................. 710/308, 313, 710/22, 27, 62, 69, 72, 305, 306; 713/2; 700/2; 725/111

(56) References Cited

U.S. PATENT DOCUMENTS

| | | | | |
|---|---|---|---|---|
| 4,872,197 A | * | 10/1989 | Pemmaraju | 379/93.01 |
| 5,734,918 A | * | 3/1998 | Odawara et al. | 712/1 |
| 5,761,462 A | * | 6/1998 | Neal et al. | 710/306 |
| 5,832,262 A | * | 11/1998 | Johnson et al. | 709/102 |
| 5,848,257 A | * | 12/1998 | Angle et al. | 712/219 |
| 6,421,728 B1 | * | 7/2002 | Mohammed et al. | 709/227 |
| 6,457,074 B1 | * | 9/2002 | Gaillard et al. | 710/25 |

FOREIGN PATENT DOCUMENTS

| WO | WO 0106704A A2 | 1/2001 |
|---|---|---|
| WO | WO 0106725A A2 | 1/2001 |

OTHER PUBLICATIONS

Shafer, Kevin. Novell's Dictionary of Networking, 1997, Novell Press, p. 80, entry 'cable modem'.*
Flynn, D., "AMBA: Enabling Reuse On–Chip Designs," IEEE Micro, US, IEEE Inc., New York, NY, vol. 17, No. 4, Jul. 1, 1997, pp. 20–27.*
Goldberg, L., "MCNS/DOCSIS MAC Clears a Path for the Cable–Modem Invasion," Electronic Design, Penton Publishing, Cleveland, OH, vol. 45, No. 27, Dec. 1, 1997, pp. 69–70, 74, 78, 80.*
Philip, S., et al., "A High–Speed Parallel DSP Architecture Dedicated to Digital Modem Applications," International Conference on Electronics, Circuits and Systems, vol. 1, pp. 477–480.

* cited by examiner

Primary Examiner—Mark H. Rinehart
Assistant Examiner—Thomas J. Cleary
(74) Attorney, Agent, or Firm—Christopher J. Rourk; Godwin Gruber LLP (57) ABSTRACT

A cable modem having a programmable media access controller (MAC). A single cable modem device includes all necessary MAC functions. The invention allows programmable MAC functions to support evolving standards (e.g., DOCSIS) without requiring expensive hardware upgrades. Bifurcated microprocessor architecture, in which first processing circuitry is programmed to implement MAC functionality for processing information flowing to and from cable media interface circuitry, and second embedded processor core or host system processor provides operating system functionality are used. Alternatively, separate processor cores provide MAC functionality for downstream and upstream data paths, respectively. Cable media interface circuitry, and other peripheral circuitry, are coupled to a peripheral bus that is linked by a bridge circuit to a system bus. The processing circuitry MAC is communicatively coupled to the system bus. Centralized DMA control directs data transfer between the peripheral and system buses as determined, at least in part, by the programmable MAC.

20 Claims, 6 Drawing Sheets

CABLE MODEM HAVING A PROGRAMMABLE MEDIA ACCESS CONTROLLER

CROSS REFERENCE TO RELATED APPLICATIONS

The present application is based on and claims priority to U.S. Provisional Patent Application Serial No. 60/183,130 entitled "CABLE MODEM HAVING A PROGRAMMABLE MEDIA ACCESS CONTROLLER," filed Feb. 17, 2000. All of such application is hereby incorporated herein by reference in its entirety, including any drawings and appendices, and is made part of the present U.S. patent application for all purpose.

The following U.S. patent applications are also hereby incorporated herein by reference in their entirety and made part of the present U.S. patent application for all purposes:

1) U.S. patent application Ser. No. 09/409,802, filed Sep. 30, 1999, entitled "Asochronous Centralized Multi-Channel DMA Controller";
2) U.S. patent application Ser. No. 09/410,167, filed Sep. 30, 1999, entitled "System and Method For Providing An Improved Synchronous Operation Of An Advanced Peripheral Bus With Backward Compatibility"; and
3) U.S. patent application Ser. No. 09/415,612, filed Oct. 9, 1999, entitled "Method and Apparatus For Upstream Burst Transmission Synchronization In Cable Modems".

BACKGROUND

1. Technical Field

The present invention relates generally to a cable modem; and, more particularly, it relates to a cable modem having a programmable media access controller.

2. Related Art

In recent years, cable television networks have become more widespread. A typical cable TV system can carry many television stations, and is effectively a high bandwidth system. Because of the increasing availability of cable television infrastructure, the use of television cables as the medium for computer data networks has the potential for giving users high bandwidth at a reasonable cost. A cable TV system, however, requires several enhancements in order to function as a data network.

In its classic form, a cable TV system carries information in only one direction—from the cable system headend to the individual user. The user interface to the system generally comprises a receiver such as a television or a stereo. The headend transmits television or stereo channels simultaneously. In general, the user has no influence on what is transmitted and can only choose among the channels the headend is transmitting.

In contrast, a data network carries data from the headend to the user (the downstream path) and from the user to the headend (the upstream path). The individual user requires equipment, such as a cable modem, that can both receive from the headend and transmit to it. A cable data network must be able to handle many individual users simultaneously, each of whom have control over what they receive and transmit.

Cable modems offer greatly improved bandwidth capable of delivering services hundreds, or even thousands, of times faster than conventional modems. Cable modems can achieve data-transfer rates of up to 40 Mbits/s by connecting directly to coaxial lines as opposed to dial-in modems, that use twisted-pair copper telephone lines.

In order for a cable TV network to operate as a data network, it requires a headend capable of both transmitting and receiving data. To ensure that each user receives the data they require, a network protocol must be implemented to allow independent users of the network to utilize the shared headend and the distribution network without interference from or receiving the data of other users.

The network protocol places requirements on both the headend and the user end. Generally, the headend serves as the network controller, and the user's cable modem must be able to respond to commands from the headend. In cable modems adhering to the well-known OSI reference model, the lowest layer is the Physical layer (PHY), while the next layer up is the Data Link layer. The Data Link layer is segmented into two parts, the Medium Access Controller (MAC), which interfaces with the PHY, and the Logical Link Control (LLC), which interfaces to the MAC and to higher layers. In general, the MAC and LLC provide the following Data Link functionality: transmit and receive data encapsulation, including framing (frame boundary delimitation, frame synchronization), addressing (management of source and destination address), and error detection (detection of physical medium transmission errors); and media access management, including collision avoidance and handling. A physical address or MAC address is a unique Data Link layer address that is assigned to every port or device that connects to a network. Other devices in the network use these addresses to locate specific ports in the network and to create and update routing tables and data structures.

In an effort to coordinate the development of multimedia high-speed data services and the interoperability of network devices, cable operators have formed the Multimedia Cable Network Systems (MCNS) Group in cooperation with the industry research and development consortium CableLabs. The MCNS group has promulgated the Data Over Cable Service Interface Specification (DOCSIS). Other standards, such as DAVIC/DVB have likewise been created. Such standards continue to evolve over time, with the frequent inclusion of additional feature sets.

Previously, integrated cable modem devices have only included physical-layer functions and a fixed-function MAC. These devices are generally compliant with a single specification or a version of a specification. Thus, any changes to the underlying specification require hardware modifications for the MAC to be compliant, resulting in lengthy and expensive product development cycles.

Further limitations and disadvantages of conventional and traditional systems will become apparent to one of skill in the art through comparison of such systems with the present invention as set forth in the remainder of the present application with reference to the drawings.

SUMMARY OF THE INVENTION

Briefly, the present invention relates to a cable modem having a programmable media access controller (MAC). In one embodiment of the invention, a single cable modem device is provided that includes all necessary MAC functions. The cable modem device advantageously allows the MAC functions to be programmed to support evolving standards (e.g., DOCSIS) without requiring expensive hardware upgrades. The cable modem device may also include data-conversion components, a complete PHY that is compliant with both United States and European standards, an Ethernet MAC, a Universal Serial Bus (USB) transceiver, an encryption engine(s), key memory components and other peripheral functions.

The cable modem device of a disclosed embodiment of the invention utilizes a bifurcated microprocessor architecture in which first processing circuitry (e.g., an embedded processor core) is programmed to implement the desired MAC functionality for processing information flowing to and from cable media interface circuits. A second embedded processor core or host system processor provides operating system functionality and controls the boot process for the first embedded processor core. In a further embodiment, separate processor cores are provided for implementing MAC functionality for the downstream and upstream data paths, respectively. The embedded microprocessor cores may be Advanced RISC Machines (ARM) microprocessors or any other suitable microprocessor cores.

In a disclosed embodiment of the invention, cable media interface circuitry, as well as other peripheral circuitry, are coupled to a peripheral bus. The peripheral bus is linked by a bridge circuit to a system bus. The processing circuitry of the programmable MAC is communicatively coupled to the system bus. A novel centralized DMA controller is provided to direct transfer of data between the peripheral bus and the system bus as determined, at least in part, by the programmable MAC.

A cable modem device having a programmable MAC according to the present invention provides a software upgrade path to permit support for new versions of standards as they are adapted. Further, the programmable nature of the cable modem device permits individual manufacturers to differentiate products at the MAC layer without having to modify or replace hardware.

Other aspects, advantages and novel features of the present invention will become apparent from the following detailed description of the invention when considered in conjunction with the accompanying drawings.

BRIEF DESCRIPTION OF THE DRAWINGS

A better understanding of the present invention can be obtained when the following detailed description of various exemplary embodiments is considered in conjunction with the following drawings.

DETAILED DESCRIPTION OF THE INVENTION

Figure 1:
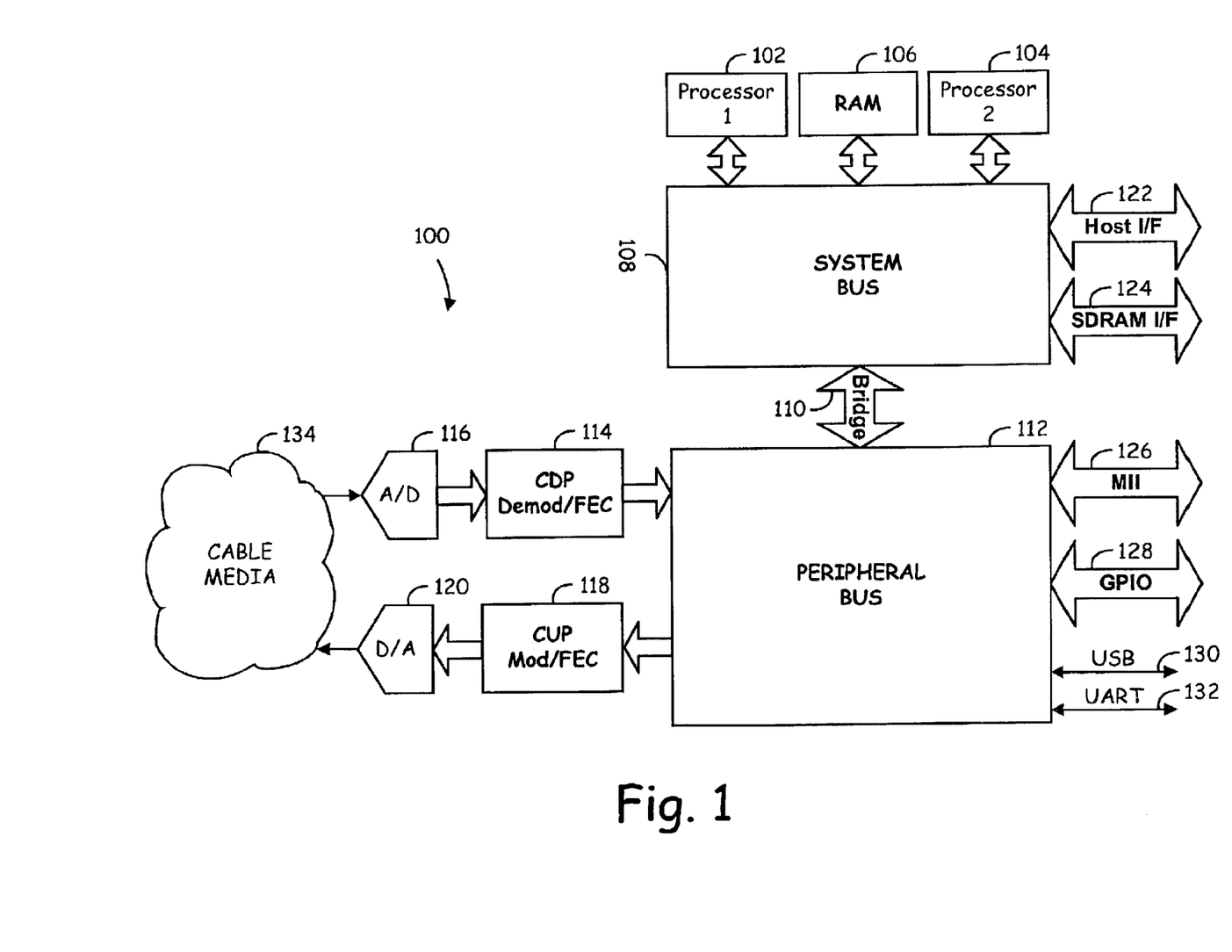
FIG. 1 is a block diagram of an exemplary cable modem device having a programmable cable media access controller according to the present invention.

FIG. 1 is a block diagram of an exemplary cable modem device 100 having a programmable cable media access controller (hereinafter referred to as a programmable MAC) in accordance with the present invention. The cable modem device 100 permits MAC functions to be programmed to support evolving standards, such as DOCSIS, without concomitant hardware upgrades. The disclosed circuitry may be part of a single integrated circuit, or a combination of integrated circuits. Alternatively, host system circuitry may be leveraged to perform certain of the functions described below.

The cable modem device 100 can be implemented in a variety of products, including external or internal cable modems with Ethernet and/or USB connections, multifunction home-networking products, interactive set-top-box solutions, digital satellite receivers, wireless networking devices having antennas, Small Office/Home Office (SOHO) equipment and Internet Protocol (IP) telephony products. Accordingly, various embodiments of the invention may interface with non-traditional "cable" media (e.g., any type of media capable of transporting MPEG packets), and the precise nature of the data transmission media is not considered critical to the invention. The cable modem device 100 may be compliant with any of a number of standards, including but not limited to, DOCSIS, DAVIC/DVB (Digital Video Broadcasting) and Voice Over IP (VOIP) standards. In the case of DOCSIS, typical MAC functionality includes MPEG and MCNS decoding and frame synchronization.

In the cable modem device 100 of FIG. 1, a first processor 102 is programmed to implement the desired MAC functionality, while a second processor 104 provides operating system support. The first processor 102 of the disclosed embodiment is designed for high performance data processing. In addition to executing an operating system, the second processor 104 may manage some message processing and scheduling. The second processor 104 preferably utilizes a real-time operating system, such as VxWorks®.

Data passed between the first and second processors 102 and 104 and other components of the cable modem device 100 may be stored in random access memory (RAM) 106. The RAM 106, as well as the first and second processors 102 and 104, are communicatively coupled to a system bus 108. The system bus 108 is linked to a peripheral bus 112 via a bridge 110.

Bi-directional communication between the cable modem device 100 and cable media 134 is conducted by physical layer devices coupled to the peripheral bus 112. More particularly, downstream data communicated from the cable media 134 is received by analog-to-digital conversion circuitry 116. The digital output of the analog-to-digital circuitry 116 is provided to a cable downstream PHY circuitry 114 that performs demodulation and forward error correction functions. The output of the cable downstream PHY circuitry 114 is provided to peripheral bus 112 for processing by the programmable MAC.

Upstream data to be communicated to the cable media 134 is provided from the peripheral bus 112 to cable upstream PHY circuitry 118 that modulates the upstream data, and may also perform error correction operations. The output of the cable upstream PHY circuitry 118 is communicated to a digital-to-analog converter 120 for provision to the cable media 134.

The cable modem device 100 of FIG. 1 may also include a number of optional interfaces for communicating with a host system or external devices. For example, a host interface 122 and expansion memory interface 124 may be coupled to the system bus 108. Likewise, the peripheral bus 112 may support a Media Independent Interface (MII) 126, a General Purpose Input/Output (GPIO) interface 128, a USB port 130, and a UART port 132. As will be appreciated, many other types of interfaces may be provided, and the precise nature of supported devices is not considered critical to the invention.

Various alternate embodiments of the cable modem device 100 are contemplated. For example, the programmable MAC could be implemented by a pair of processors, with the upstream code handled by one processor and the downstream code handled by another processor. Such a configuration may provide advantages in terms of software partitioning.

Figure 2:
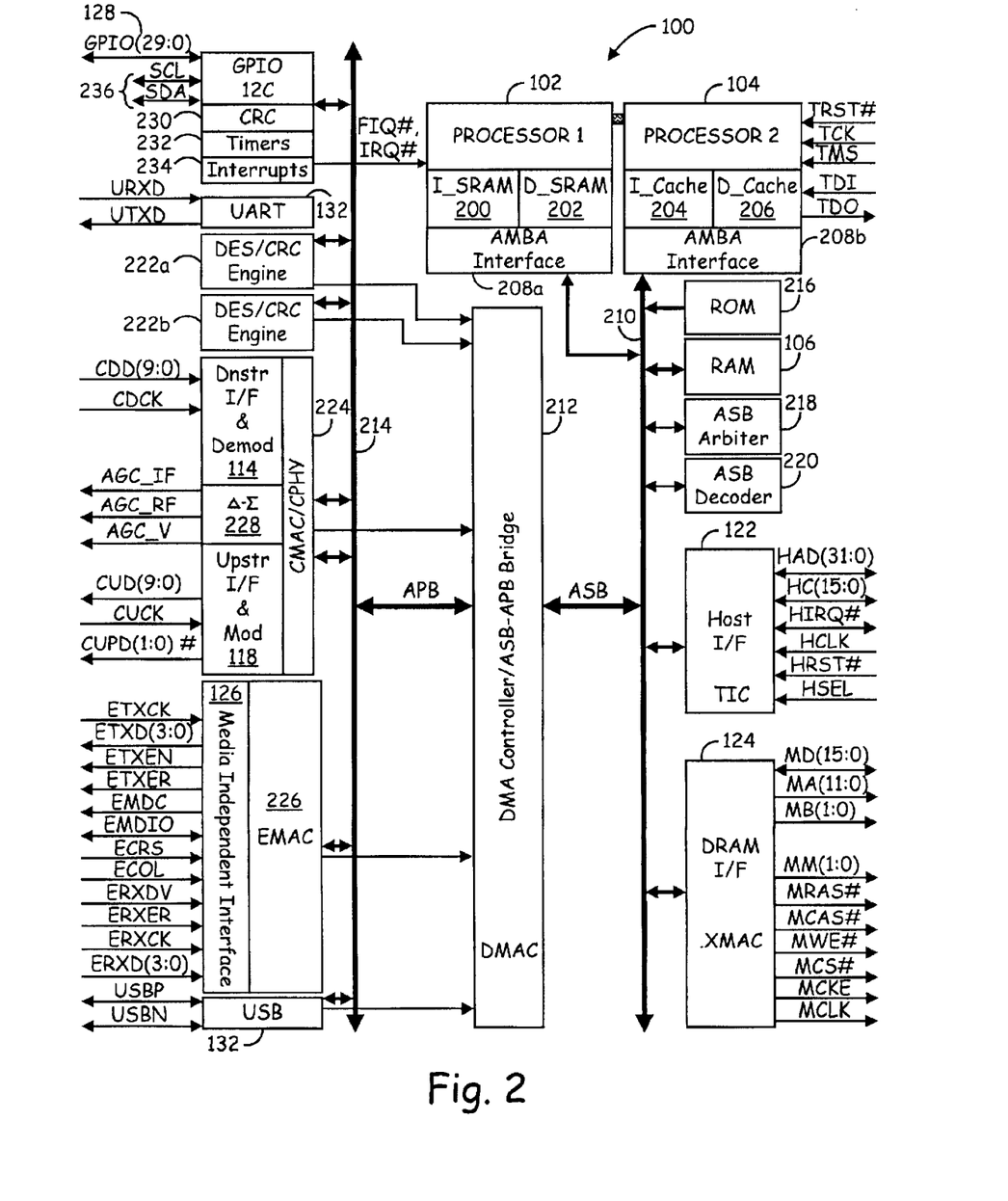
FIG. 2 is a schematic block diagram providing exemplary details of the cable modem device of FIG. 1.

FIG. 2 is a schematic block diagram providing exemplary details of the cable modem device 100 of FIG. 1. In this embodiment of the invention, the cable modem device 100 utilizes the Advanced System Bus (ASB 210) and Advanced Peripheral Bus (APB 214) protocol and bus architecture as specified in the Advanced Microcontroller Bus Architecture (AMBA) specification. The AMBA specification defines an on-chip communication standard for designing high-performance embedded microcontrollers. The ASB 210 is generally utilized for high-performance system modules, supporting the efficient connection of processors, on-chip memories, and off-chip external memory interfaces with low-power peripheral/macrocell functions. The APB 214 is generally utilized with low-power peripherals, and is optimized for minimal power consumption and reduced interface complexity in supporting peripheral functions.

Another bus defined by the AMBA specification is the Advanced High-Performance Bus (AHB). The AHB is generally utilized with high-performance, high-frequency system modules. The AHB may act as the high-performance system backbone bus, and supports the efficient connection of processors, on-chip memories, and off-chip external memory interfaces with low-power peripheral macrocell functions.

In the disclosed embodiment of the invention, the ASB 210 is utilized as the system bus 108, although it is contemplated that other buses such as the AHB may also be used. The ASB 210 is the bus on which the first and second processors 102 and 104, RAM memory 106, and other direct memory access (DMA) devices reside. The ASB 210 provides a high-bandwidth interface between the system elements that are involved in the majority of data transfers. An ASB-APB bridge/centralized DMA controller 212 is provided for linking the ASB 210 to the lower bandwidth APB 214, where most of the peripheral devices in the cable modem device 100 are located. As discussed in greater detail below, the ASB-APB bridge/centralized DMA controller 212 is both an ASB 210 master and an APB 214 master, and utilizes burst transfers and pipelining of data to optimize bus efficiency.

The APB 214 provides the basic peripheral macrocell communications infrastructure. Such peripherals typically have interfaces which are memory-mapped registers, have few high-bandwidth interfaces, and are accessed under program control (such as the programmable MAC). In the disclosed embodiment of the invention, certain performance enhancements have been made to the APB and ASB, as well as the device interfaces to these buses, as set forth in greater detail in previously incorporated patent applications entitled, "System and Method for Providing an Improved Synchronous Operation of an Advanced Peripheral Bus with Backward Compatibility", and "Asochronous Centralized Multi-Channel DMA Controller".

Although the disclosed cable modem device 100 utilizes the AMBA bus architecture, in a broader implementation the programmable MAC may be configured to operate with a wide variety of buses and interface with any type of peripheral device. For example, in a host processor-based implementation, the ASB 210 may be replaced with a PCI bus or other type of bus typically found in computer systems.

In this embodiment of the invention, the first processor 102 includes a microprocessor macrocell providing a high-performance integer core RISC engine that utilizes an instruction memory 200 and a data memory 202. The second processor 104 of this embodiment is a cached microprocessor macrocell (e.g., an ARM940T macrocell by Advanced RISC Machines) providing a high-performance integer core RISC engine. The second processor 104 has a separate instruction cache 204 and data cache 206, as well as a memory configuration and protection unit. The instruction and data caches 204 and 206 of the second processor 104 support concurrent processing. In addition, the second processor 104 is capable of performing random read/write ASB accesses and cache line fills, as well as buffered burst writes. The first processor 102 and second processor 104 communicate with the ASB 210 via an AMBA Interface 208a and 208b, respectively.

The first processor 102 and second processor 104 each have two interrupt inputs FIQ# and IRQ# that are active-low level-sensitive. In the disclosed embodiment of the invention, the FIQ# interrupt is of higher priority than the IRQ# interrupt and is serviced first when both interrupts are asserted in unison. Servicing an FIQ# interrupt disables an IRQ# interrupt until the FIQ# interrupt handler exits or re-enables the IRQ# interrupt.

In addition to RAM 106, a read only memory (ROM) 216 may be provided on the ASB 210. Further, an ASB arbiter 218 is coupled to the ASB 210. The ASB arbiter 218 determines which ASB master has access to the ASB 210. In this embodiment, there are four ASB masters capable of requesting the ASB 210: the first processor 102, the second processor 104, the host interface 122, and the DMA controller 212. The arbitration scheme utilized by the ASB arbiter 218 is based on priority. The DMA controller 212 has the highest priority in order to minimize system latency and data buffering for certain peripherals. The host interface 122 has second priority since its access may be less frequent. The first processor 102 has next priority since its accesses may be generally more time critical than those of the second processor 104. Of course, other arbitration schemes may be utilized.

The host interface 122 may also function as a test interface controller (TIC) that provides a parallel test access port to the first and second processor 102 and 104, as well as the ASB 210. The TIC allows externally applied test vectors to be converted into internal bus transfers. More than one host interface 122 may be maintained by the cable modem device 100. For example, in addition to the host interface 122, a PCI or similar interface may added for communicating to a host system, while the host interface 122 communicates with other peripherals such as voice attachments. The host interface 122 supports a slave mode which provides an external host processor access to its internal memory, as well as memory-mapped register set. The host interface 122 also supports a master mode which allows control signals to access external slave devices such as flash memory or data peripherals.

An ASB decoder 220 is also coupled to the ASB 210. The ASB decoder 220 decodes addresses on the ASB 210, and provides selection signals to each ASB slave. The expansion memory interface 124 includes an expansion memory access controller (XMAC) that provides an interface to support external memory. In the disclosed embodiment of the invention, the expansion memory interface 124 is a 16-bit synchronous interface, although many variations are possible.

As previously mentioned, a number of physical interfaces to external data sources are coupled to the APB 214. In particular, a cable media access controller (CMAC) 224, including a system timer and interfaces to the cable downstream PHY circuitry 114 and cable upstream PHY circuitry 118, is provided to support communications with a cable media 134. The CMAC 224 hardware and firmware combine to support a desired specification (e.g., a DOCSIS feature set for the MAC sub-layer of an MCNS cable modem). In general, CMAC 224 aligns incoming packets and prepends a time stamp and appends a pattern recognition trailer structure to form word packets to be delivered to memory by the DMA controller 212. The CMAC 224 is also responsible for requesting data from the DMA controller 212 at the appropriate time, calculating checksums, and encrypting all or part of the upstream data and bursting the data to the upstream cable upstream PHY circuitry 118. Exemplary details of the later operation are provided in the previously-incorporated patent application entitled "Method and Apparatus for Upstream Burst Transmission Synchronization in Cable Modems." Delta sigma converter circuitry 228 is also coupled to the CMAC 224 to provide automatic gain control and other functionality for the cable PHY layer.

A pair of DES/CRC engines 222a and 222b are provided as peripherals to the APB 214. The DES/CRC engines 222a and 222b are capable of performing DES encryption or decryption, and/or cyclic-redundancy-checks on a stream of data supplied by the DMA controller 212. Providing more than one DES/CRC engine 222 permits a plurality of data flow threads to be processed simultaneously.

An Ethernet external datalink is also coupled to the APB 214, and is comprised of an Ethernet media access controller (EMAC) 226 and the MII 126. In the disclosed embodiment of the invention, the EMAC 226 supports the MAC sublayer of the IEEE 802.3 specification and allows it to be connected to an IEEE 802.3 10/100 Mbps (100Base-T and 10Base-T) MII compatible EPHY device or seven-wire HomeLan PHY device. The MII 126 provides a port to transmit and receive data that is media independent, multi-vendor interoperable, and supports all data rates and physical standards. The port consists of datapaths that are generally four bits wide in each direction, as well as control and management signals. The MII 126 can be configured as a glueless connection to support Ethernet or HomeLan serial mode.

A USB interface 132 is also coupled to the APB 214. The USB interface 132 can couple to any of a number of compliant external devices. In the disclosed embodiment of the invention, the USB interface 132 supports receive and transmit signaling of 12-Mb/s.

A number of other miscellaneous peripherals may also be coupled to the APB 214. For example, a UART 132 may be provided to receive and transmit data, for example, over a telephone line. In addition, a CRC engine 230 is provided to perform single-cycle computations on input data up to 32 bits at a time. This CRC engine 230 is intended to provide high-performance Header Check Sequence (HCS) calculations, as used in both downstream and upstream CMAC operations.

Programmable timer circuitry 232 is also coupled to the APB 214, and may perform a number of functions. For example, the programmable timer circuitry 232 may generate real-time interrupts, as well as perform system "watchdog" operations. The programmable timer circuitry 232 may also be used as an external event counter.

A pair of interrupt controllers 234 may be provided, one for each of the first processor 102 and second processor 104. All peripheral interrupt sources are routed through the interrupt controllers 234, and reduced to two active low inputs to the first and second processors 102 and 104—FIQ# and IRQ# —which are asserted in response to specified data operations. Software control interrupts may also be provided.

A general purpose I/O bus 128 and $I^2C$ serial bus 236 are also coupled to the APB 214. It is contemplated that two of the I/O pins of the general purpose I/O bus 128 may be enabled for software controlled $I^2C$ operations via a control register. Pins of the general purpose I/O bus 128 can also serve as external interrupt inputs.

Figure 3:
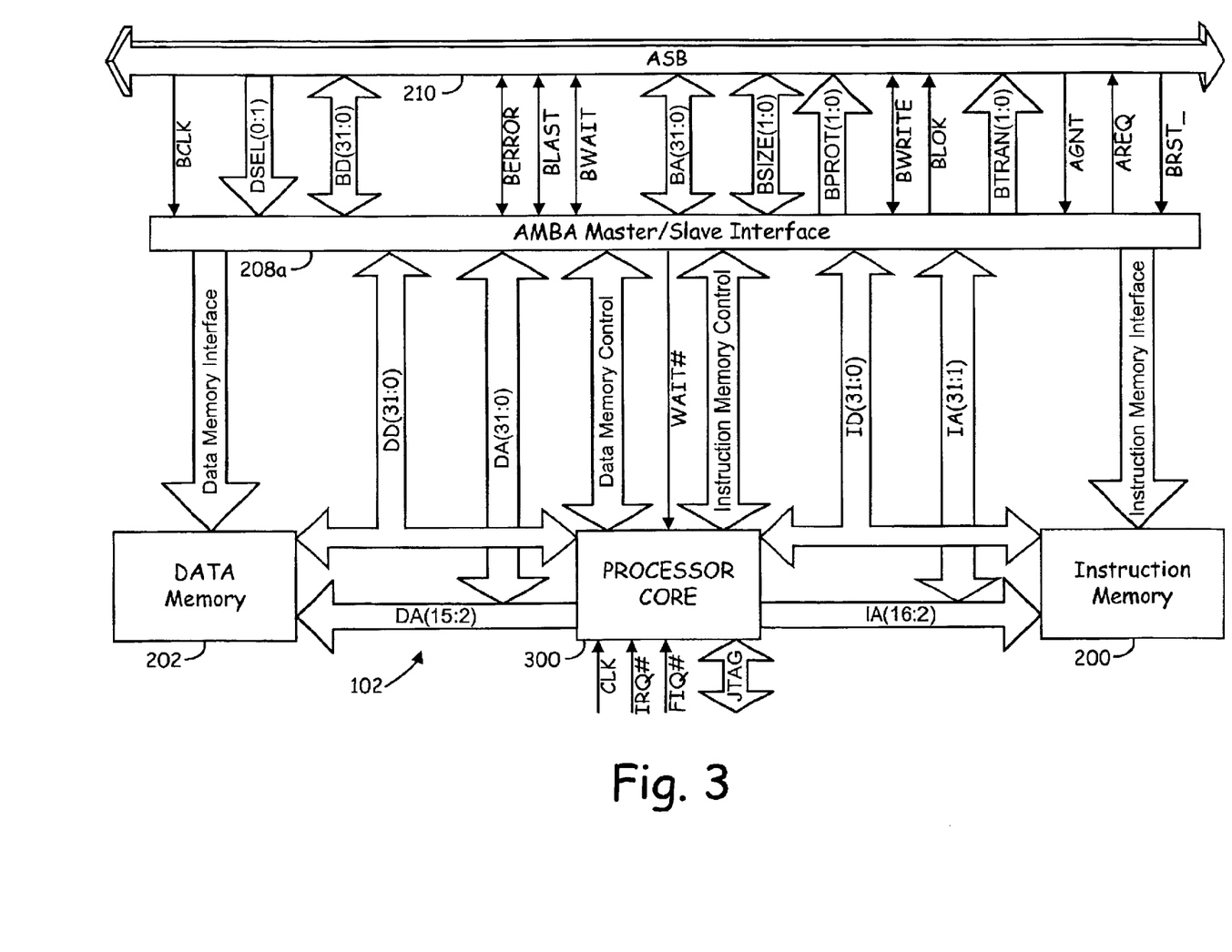
FIG. 3 is a schematic block diagram providing exemplary details of processing circuitry of FIG. 1 capable of being programmed to implement media access controller functionality in accordance with the present invention.

FIG. 3 is a schematic block diagram providing exemplary details of the first processor 102 of FIG. 1. Again, the first processor 102 is capable of being programmed to implement MAC functionality in accordance with the present invention.

As discussed generally above, the first processor 102 comprises a processor core 300, an instruction memory 200, and a data memory 202. Each of these elements communicates with the ASB 210 via the AMBA interface 208a. In one contemplated embodiment of the invention, the processor core 300 is a high-performance integer core such as that used in the ARM940T processor macrocell. In one embodiment of the invention, the instruction memory 200 comprises a 20K×32 SRAM coupled to the instruction address and data busses IA and ID. The data memory 202 of the this embodiment comprises a 12K×32 SRAM coupled to the data and address buses DD and DA.

Inputs to the processor core 300 include a JTAG test bus, a clock signal CLK, and the interrupts FIQ# and IRQ#. The processor core 300 also interfaces with an instruction memory control bus and data memory control bus coupled to the AMBA interface 208a. In accordance with the ASB specification, a number of control, address and data signals are communicated between the AMBA interface 208 and the ASB 210.

Figure 4:
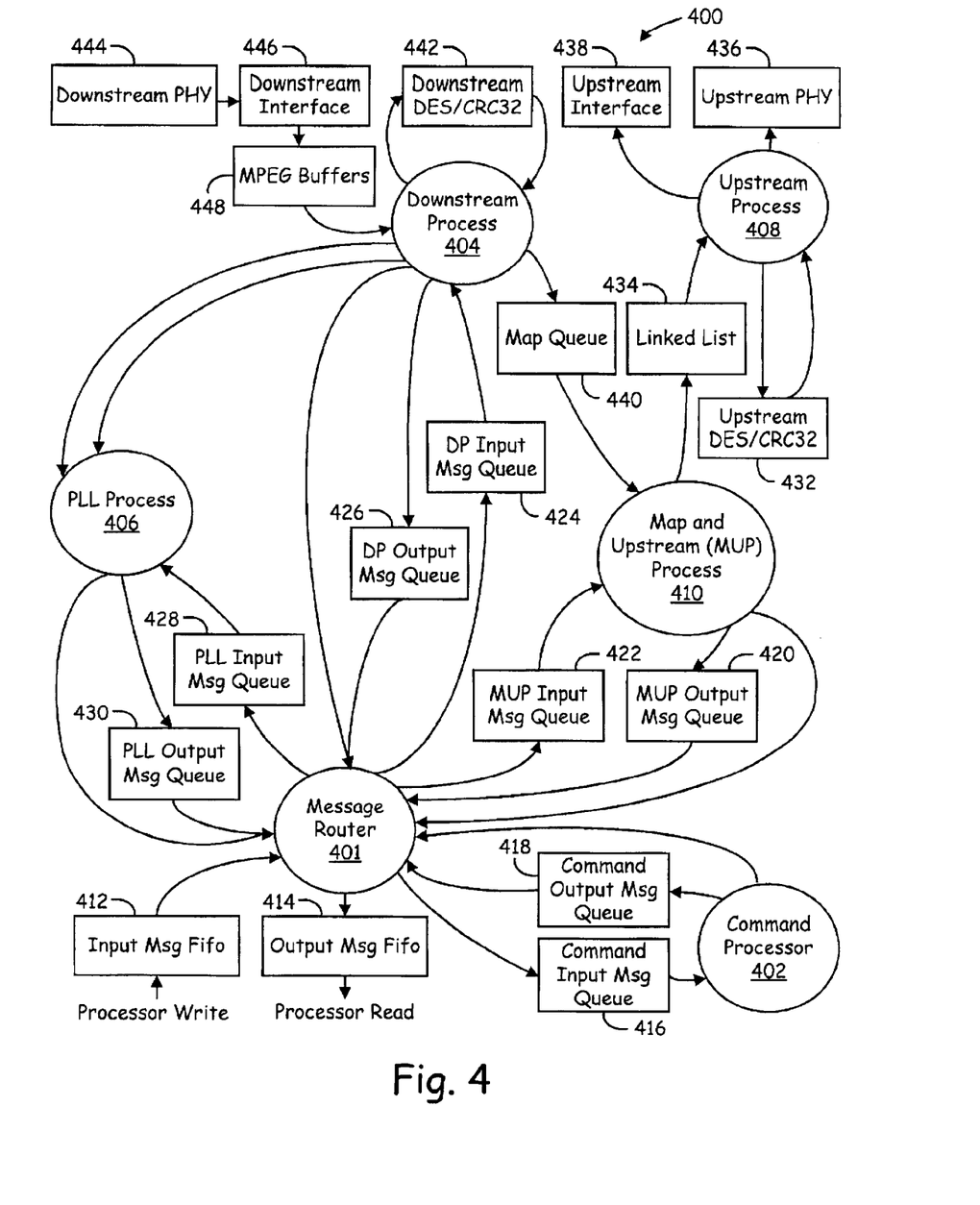
FIG. 4 is a state diagram providing details of an exemplary programmable cable media access controller software architecture implemented by the cable modem device of FIG. 1.

FIG. 4 is a state diagram providing details of an exemplary programmable MAC 400 software architecture implemented by the cable modem device 100 of FIG. 1. The programmable MAC 400 software of this embodiment of the invention is composed of several software processes that perform various tasks and functions. A number of the programmable MAC 400 processes communicate with each other via shared memory regions, functions, or subroutines. Other programmable MAC 400 processes communicate with the operating system via a programmable MAC interface. The programmable MAC interface may be implemented as a reserved region of data memory or message queues, an interrupt controller, and predefined messages to pass data, configuration parameters, and status information across the interfaces. The programmable MAC 400 processes may span one or more processor contexts. Transitions between programmable MAC 400 processes may occur via external hardware interrupts (IRQ or FIQ), or via a software interrupt causing a change of context. In general, a process executing within a given context will execute linearly until completion or until another context switch occurs.

The exemplary programmable MAC 400 software of FIG. 4 comprises six (6) major process: a message router process 401, a command processor 402, a downstream process 404, a PLL process 406, an upstream process 408, and a map and upstream (MUP) process 410. These processes are provided by way of example, and it is contemplated that a greater number or a fewer number of processes could be implemented without departing from the spirit or scope of the invention.

The message router 401 is primarily responsible for managing the flow of information into and out of the programmable MAC. This includes placing programmable MAC downstream data (protocol data units (PDU) and MAC management messages (MMM)) and status messages in the programmable MAC output message FIFO 414. The message router 401 is also responsible for retrieving programmable MAC upstream data and configuration messages from the programmable MAC input message FIFO 412. Messages retrieved by the message router 401 are then routed to the appropriate programmable MAC 400 process. The message router 401 is further responsible for managing programmable MAC status interrupts.

The message router 401 also interacts with a command processor that receives and processes MCNS and other commands. Commands directed to the command processor 402 are placed in the command input message queue 416, while a command output message queue 418 is used to store output messages from the command processor 402.

The downstream process 404 manages and monitors the flow of downstream data. More particularly, the downstream process 404 of the disclosed embodiment of the invention is responsible for: MPEG synchronization, MPEG frame header verification, MCNS frame header verification, extraction of MCNS extended header information, SID perfect filtering, MAC address perfect filtering, imperfect multi-cast address filtering, information element filter, DES decryption, CRC validation, downstream data transfer to the appropriate destination (PLL, MAP processor, or programmable MAC external interface), and downstream statistics.

Messages from the message router 401 to the downstream process 404 are placed in a downstream process input message queue 424, while messages from the downstream process 404 to the message router 401 are placed in a downstream process output message queue 426. The downstream process 404 communicates with a downstream PHY 444 via a downstream interface 446 and MPEG buffers 448. The downstream process 404 further utilizes a downstream DES/CRC engine 442 to provide decryption and validation functionality.

The PLL process 406 functions to provide a local clock reference that is phase-locked to a CMTS clock. The PLL process 406 further provides conversion functions to convert between system time and the local hardwire time. In addition, the PLL process 406 communicates status information to the second processor 104 and the other programmable MAC processes. Messages from the message router 401 to the PLL process 406 are placed in a PLL input message queue 428. Messages from the PLL process 406 to the message router 401 may be placed in a PLL output message queue 430.

The upstream process 408 manages the transmission of upstream data. More particularly, the upstream process 408 handles: concatenation/fragmentation of upstream frames, checksum or CRC computation, DES encryption, programming the upstream physical layer or PHY 436, and ensuring time-to-send requirements are met. The upstream process 408 utilizes an upstream DES/CRC function 432 to coordinate encryption and validation of upstream data. The upstream process 408 further communicates with an upstream interface 438, and receives linked list data 434 from the MUP process 410.

The MUP process 410 handles the processing of downstream MAP frames, manages the scheduling of upstream frame transmission, and handles the ranging process used to optimize communications with a cable headend. The MUP process 410 of the disclosed embodiment of the invention has two entry points: a MUP input message queue 422 that is called by the message router 401 when a new input message is available in the queue, and a MAP queue 440 that is called by the downstream process 404 when new MAP is available. MUP output message queue 420 is also provided for passing data to the message router 401.

It is contemplated that additional functions may be added to the exemplary programmable MAC 400 software architecture of FIG. 4, and that other functions may be implemented in hardware.

Figure 5A:
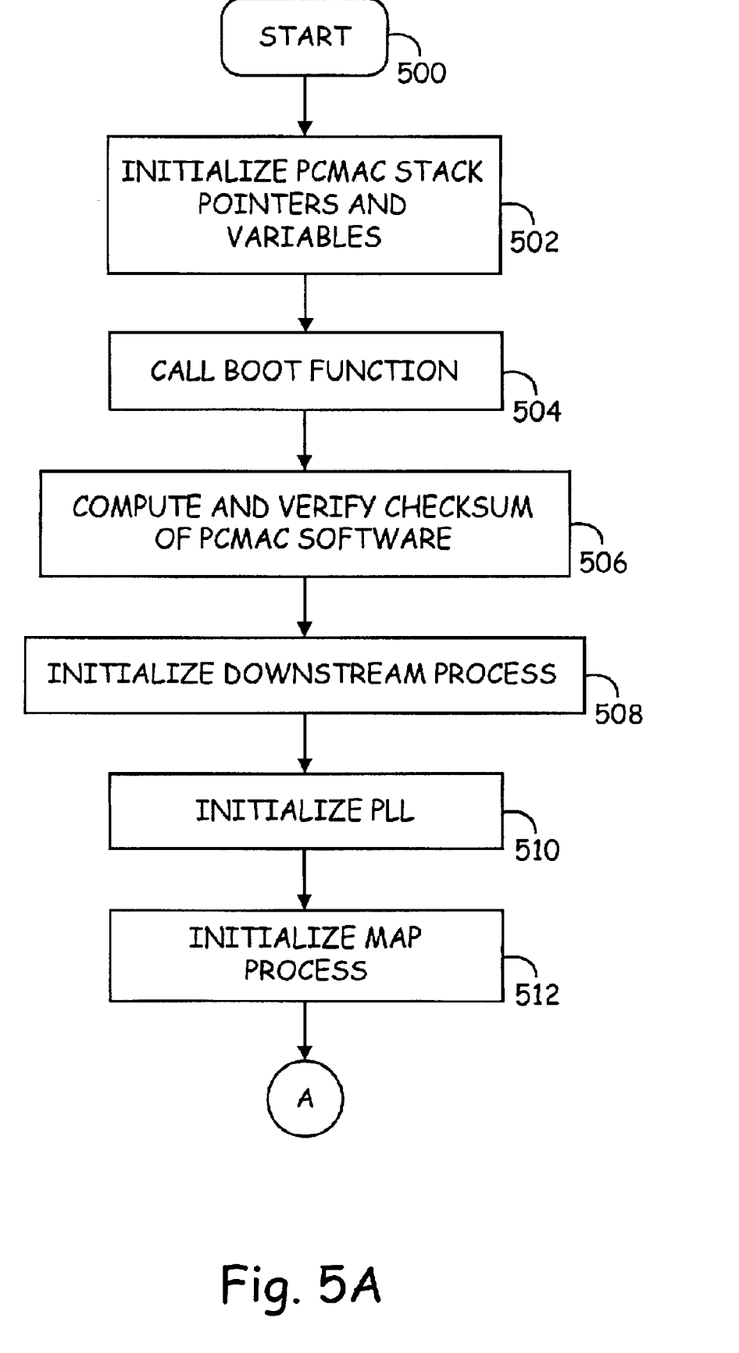
FIGS. 5A and 5B are flow diagrams of an exemplary boot process for a programmable cable media access controller according to the present invention.
Figure 5B:
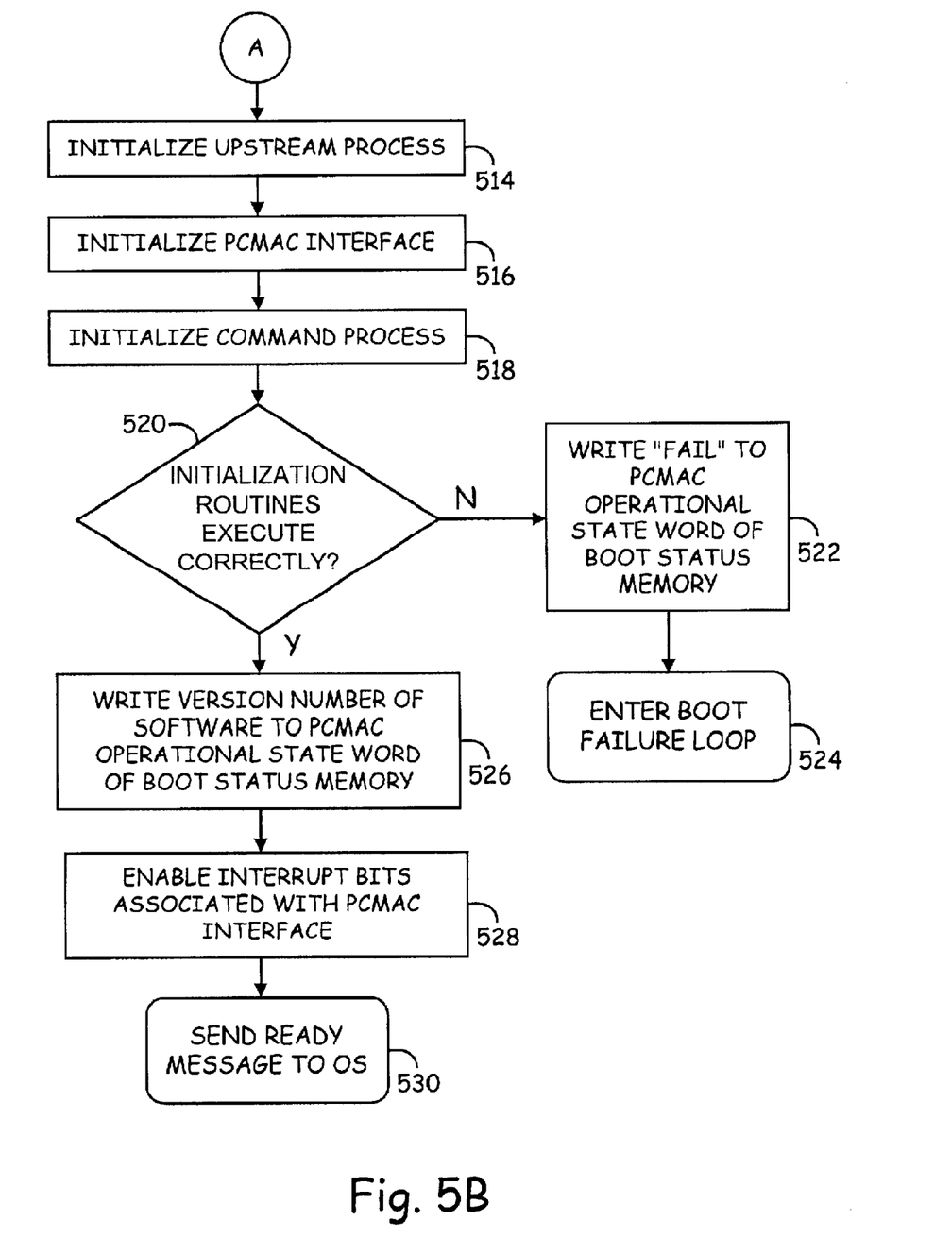

FIGS. 5A and 5B are flow diagrams of an exemplary boot process for a programmable MAC according to the present invention. The boot process of the disclosed embodiment of the invention maintains a boot status memory area at a fixed address in memory to allow the second processor 104 to monitor the boot status of the programmable MAC. The boot status memory region preferably resides at a fixed, word-line address in the processor data memory. The programmable MAC updates words in the boot status region with non-zero values as it proceeds through the boot process. The boot process may be conducted by the second processor 104, by a host system via a host system interface 122, or by other circuitry of the cable modem device 100.

Following commencement of the boot process at step 500, the programmable MAC stack pointers and variables are initialized at step 502. The programmable MAC can maintain separate stacks for each of the separate contexts or operating modes of the processor 102. These stacks, as well as processor data memory variables, are initialized in this step.

Next, in step 504, the boot process calls a boot function to perform the remainder of the disclosed programmable MAC boot process. The boot function of the boot process proceeds to step 506, where a checksum is performed on the programmable MAC software loaded into the processor instruction memory. The computed checksum is then compared to a value stored in a global memory variable. Next, beginning with step 508, all programmable MAC software processes are initialized via initialization routines called by the boot process. The downstream process is first initialized in step 508, followed by initialization of PLL in step 510. The MAP process is next initialized in step 512.

The boot process continues at step 514 (FIG. 5B) where the upstream process is initialized. The programmable MAC interface is next initialized in step 516, followed by initialization of the command process in step 518.

Following initialization of the programmable MAC software processes, the boot process determines if the initialization routines executed correctly. If not, the boot process writes a "fail" value to the operating state word of the boot status memory. Next, a boot failure loop is entered in step 524, although it is contemplated that step 522 may be performed upon entry into the boot failure loop. In addition, if the boot process fails, a power-on reset may be applied by the second processor 104.

If the initialization routines executed correctly as determined in step 520, the boot process proceeds to step 526 and a version number of the programmable MAC software is written to the operating state word of the boot state status memory. Next, in step 528, the boot process enable interrupt bits associated with the programmable MAC interface or message router 401. Finally, the boot process sends a message to the operating system indicating that the power on processes is complete and the programmable MAC is ready for operation.

Thus, a cable modem having a programmable MAC has been described. The programmable MAC features of the cable modem provide a software upgrade path to permit support for new versions and variations of cable modem standards, thereby reducing or eliminating hardware development costs.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A cable modem having a programmable media access controller, comprising:

a system bus;

a plurality of processors, each of the plurality of processors is communicatively coupled to the system bus, that perform a plurality of processing functions, the plurality of processing functions are partitioned, at least in part, between at least two of the plurality of processors;

a peripheral bus that is operable to perform transfer of cable media;

a bridge that communicatively couples the system bus and the peripheral bus;

a peripheral processing device, communicatively coupled to the peripheral bus, that is operable to perform processing of a selectively off-loaded portion of the cable media; and wherein one of the plurality of processors monitors a boot status for the programmable media access controller.

2. The cable modem of claim 1, wherein one of the plurality of processors supports upstream data transfer of cable media received by the cable modem; and at least one other of the plurality of processors supports downstream data transfer of the cable media transmitted by the cable modem.

3. The cable modem of claim 1, wherein one of the plurality of processors is operable to perform at least one of message processing and scheduling.

4. The cable modem of claim 1, wherein the bridge comprises a direct memory access controller that is operable selectively to provide a portion of the cable media to one of the plurality of processors and to provide the off-loaded portion of the cable media to the peripheral processing device.

5. The cable modem of claim 1, further comprising at least one additional peripheral processing device, communicatively coupled to the peripheral bus, that is operable to perform processing of at least one additional selectively off-loaded portion of the cable media.

6. The cable modem of claim 1, wherein the plurality of processing functions comprises operating system functionality.

7. The cable modem of claim 1, wherein the plurality of processing functions comprises media access control functionality.

8. The cable modem of claim 1, wherein one of the plurality of processors employs embedded code to support media access control functionality.

9. A cable modem device having a programmable media access controller, comprising:

a bifurcated bus structure comprising a first bus and a second bus;

a partitioned processor structure, communicatively coupled to the first bus, comprising a plurality of processors, that is operable to perform a plurality of processing functions;

a co-processor, communicatively coupled to the second bus, that is operable to support processing of cable media that is selectively off-loaded from at least one of the plurality of processors;

an input/output interface, communicatively coupled to the second bus, that is operable to perform data transfer of a plurality of data to the second bus;

a direct memory access controller that communicatively couples the first bus and the second bus and that is operable to support off-loading of at least one function of the plurality of functions to the co-processor;

wherein one of the plurality of processors monitors a boot status for the programmable media access controller.

10. The cable modem device of claim 9, further comprising at least one additional co-processor, communicatively coupled to the second bus, that is also operable to support processing of cable media that is selectively off-loaded from at least one of the plurality of processors.

11. The cable modem device of claim 9, wherein the first bus employs an Advanced System Bus protocol; and the second bus employs an Advanced Peripheral Bus protocol.

12. The cable modem device of claim 9, wherein one of the plurality of processors supports upstream data transfer of cable media received by the cable modem; and at least one other of the plurality of processors supports downstream data transfer of the cable media transmitted by the cable modem.

13. The cable modem device of claim 9, wherein the co-processor is operable to perform at least one of DES encryption and DES decryption.

14. The cable modem device of claim 9, wherein the plurality of processing functions comprises operating system functionality and media access control functionality.

15. The cable modem device of claim 9, wherein the second bus operates consuming power at a rate lower than a rate at which the first bus consumes power.

16. The cable modem device of claim 9 manufactured as an integrated circuit.

17. A method to perform processing within a cable modem having a programmable media access controller the method comprising:

performing cable media processing using a plurality of processors, the cable media processing is partitioned, at least in part, between at least two of the plurality of processors;

selectively off-loading a portion of the cable media from at least one of the plurality of processors to a co-processor;

processing the off-loaded portion of the cable media using the co-processor; and monitoring with one of the plurality of processors a boot status for the programmable media access controller.

18. The method of claim 17, wherein the method is performed within an integrated circuit.

19. The method of claim 17, wherein at least one of the plurality of processors comprises embedded code that is substantially operable for media access control functionality.

20. The method of claim 17, further comprising directing upstream and downstream communications of cable media using at least two of the plurality of processors.

* * * * *